Aug. 22, 1950
A. T. CLARKE
2,519,822
HOLDER FOR JEWELER'S MAGNIFYING
GLASS, LOUPE AND THE LIKE
Filed Sept. 5, 1946
2 Sheets-Sheet 1
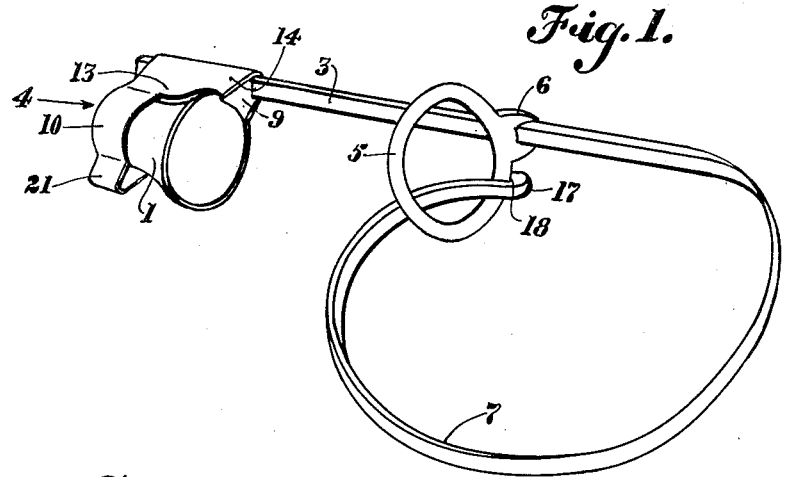
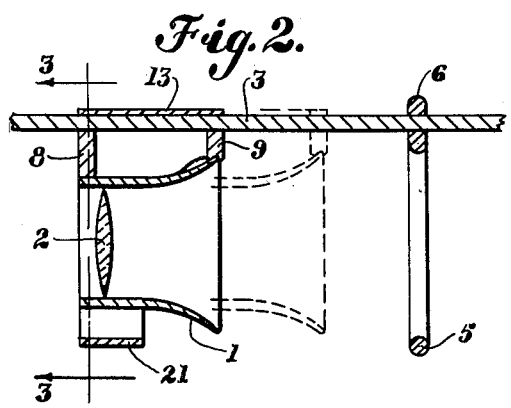
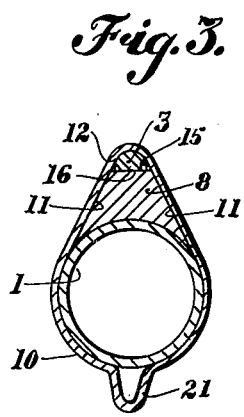
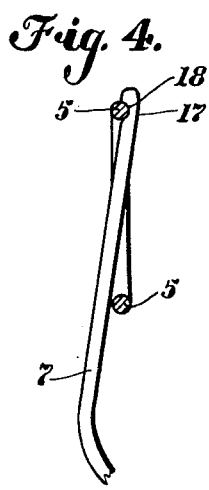
INVENTOR.
Albert T. Clarke
BY Heard Smith Tremont
Attorneys.

Aug. 22, 1950   A. T. CLARKE   2,519,822
HOLDER FOR JEWELER'S MAGNIFYING
GLASS, LOUPE AND THE LIKE
Filed Sept. 5, 1946   2 Sheets-Sheet 2

INVENTOR.
Albert T. Clarke
BY Heard Smith Tennant
Attorneys

Patented Aug. 22, 1950

2,519,822

UNITED STATES PATENT OFFICE 2,519,822

HOLDER FOR JEWELER'S MAGNIFYING GLASS, LOUPE, AND THE LIKE

Albert T. Clarke, Waltham, Mass.

Application September 5, 1946, Serial No. 694,876

2 Claims. (Cl. 88—41)

This invention relates to means for supporting in proper position a magnifying glass or loupe such as jewelers, watch makers, tool makers, and etc., use to magnify work on which they are operating.

It is a common practice for watch makers and jewelers to wear the jeweler's magnifying glass in the eye, that is with the large end of the glass held in place by the bones surrounding the eye socket. When the jeweler's glass is held in place in this manner, it is necessary for the user to bring his face quite close to the work on which he is operating in order to get the proper focus, and while this is no serious objection in the case of a watch maker, yet in the case of a tool maker or die maker, it is an objection to have to work on the material with one's face as close to the material as it must be when the jeweler's glass is worn in the eye.

It is, therefore, one of the objects of my present invention to provide a novel holder for a watch maker's magnifying glass or loupe by which the magnifying glass can be held at a suitable distance from the eye of the user thus making it possible for him to obtain the correct focus on the work when his face is at a considerable distance therefrom.

A further object of the invention is to provide a novel holder for jeweler's magnifying glass which not only holds the glass at a considerable distance from the eye of the user, but which is also constructed so that the magnifying glass can be readily adjusted toward or from the eye of the user.

Further objects of the invention are to provide various improvements in a device of this character such as will be more fully hereinafter set forth and after which the novel features will be pointed out in the appended claims.

In the drawings, wherein I have illustrated a selected embodiment of the invention, Fig. 1 is a perspective view of a holding device embodying the invention showing the device when not in use.

Fig. 2 is a fragmentary sectional view illustrating the manner in which the magnifying glass or loupe can be adjusted.

Fig. 3 is a section in the line 3—3, Fig. 2.

Fig. 4 is a fragmentary sectional view showing the manner in which the flexible end of the supporting arm is held in its folded position.

Figure 5:
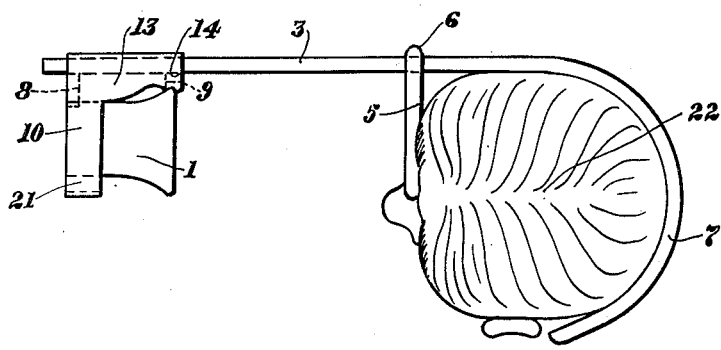
Fig. 5 is a top plan view illustrating the manner in which the device is used.

In the drawings 1 indicates an ordinary watch maker's magnifying glass or loupe which is provided with the usual magnifying lens 2. The holding device which I have invented comprises a supporting arm 3 which has at one end thereof a holder 4 for the loupe or watch maker's magnifying glass 1, which holder will be presently described.

The holding device also includes novel means for removably clamping the arm 3 and its holder 4 to the head 22 of the person using the device. Such clamping means includes a front clamping member rigidly mounted on the arm 3 and extending laterally therefrom and designed to engage the portion of the face of the user surrounding his eye socket, and a rear resilient clamping member to engage the rear of the head of the user, the clamping action of the front and rear clamping members on the head of the user being sufficient to hold the arm 3 in its operative position.

The front clamping member is an annular member 5 which, as stated above, is of a size and shape to rest against the portion of the face of the user surrounding his eye socket. This member 5 has rigid therewith an ear 6 provided with an opening through which the arm 3 extends, and said ear is rigidly secured to the arm in any approved way so that the annular front clamping member is rigidly secured to the arm and extends laterally therefrom.

The rear resilient clamping member is indicated at 7 and is in the form of a curved resilient member designed to fit around the back of the head 22 of the user. This rear clamping member 7 may be made as an extension of the arm 3.

In using the device it is placed on the head of the user so that the front annular clamping member 5 rests against the portion of the face of the user surrounding his eye socket, and hence stands directly in front of one of his eyes, and the rear resilient clamping member 7 is placed around behind the head of the user as clearly seen in Fig. 5. The resilient rear clamping member 7 is so made that it naturally is curved on a radius less than that which it assumes when it is placed on the head of the wearer as shown in Fig. 1. When, therefore, the device is used, the curved resilient rear clamping of member 7 has to be straightened somewhat to give it a curvature such as will fit around the head of the wearer and the resiliency of said rear clamping member 7 therefore acts to hold the annular front clamping member 5 snugly against the face of the wearer and the clamping engagement of the two clamping members on the head of the wearer is sufficient to hold the device in proper position as shown in Fig. 1.

The holder 4 is preferably made so that it can be adjusted longitudinally of the supporting arm 3 so as to bring the magnifying glass 1 nearer to or further from the eye of the user. When the magnifying glass is spaced from the eye of the user, his face, when using the device, will be held quite a distance away from the material on which he is working. This is a decided advantage for a tool maker or a machinist because it permits him to get the necessary magnified view of the work without bringing his face so close to the bench or to the work as would be necessary if the magnifying glass were fixed in the eye of the user as is usually done in the case of watch makers.

The holder 4 herein illustrated comprises two spacing elements 8 and 9 resting against two ends of the casing of the watch maker's magnifying glass 1, and a clamping band 10 which encircles the small end of the magnifying glass 1 and is welded or adhesively secured to the sides 11 of the spacing member 8 and which forms with the spacing member 8 an opening 12 of a size and shape to receive the end of the supporting arm 3. This clamping band 10 is widened as shown at 13 to a dimension equal to the length of the watch maker's glass 1 and the end edge 14 of the widened portion 13 is welded or adhesively united to the sides of the spacer 9 and forms with said spacer an opening in line with the opening 12 which is of a size and shape to receive the end of the supporting arm 3. Said arm 3 is illustrated as having a flat side 15 and when the parts are assembled, this flat side of the arm rests against the flat end faces 16 of the spacing elements 8, 9. By reason of this construction, the holder is prevented from turning around on the supporting arm 3 and is always held at one side of the arm as shown in the drawings in a position to hold the magnifying glass 1 axially alined with the annular member 5.

The band 10 is made so that it will have a yielding clamping engagement with the small end of the casing of the magnifying glass 1, and for this purpose the band is shown as made with a loop extension 21 which permits opposite sides of the band to be spread slightly if necessary to enter the small end of the magnifying glass 1 into said band, the resiliency of the loop extension of the band 10 serving to provide a yielding clamping engagement between the band and the magnifying glass. The band 10 and the spacing element 8 constitute a yielding socket designed to removably receive the small end of the magnifying glass 1 and the other spacer 9 constitutes a positioning member, which by its engagement with the periphery of the larger end of the magnifying glass, assists in holding said glass axially alined with the annular member 5.

The device is preferably made so that the holder 4 with the magnifying glass 1 therein can be adjusted longitudinally of the supporting arm so as to place the magnifying glass closer to or further from the eye piece 5.

One way of securing this end is to make the holder 4 so that it can slide back and forth on the end portion of the arm 3 as shown in Figs. 1, 2, and 5.

Another way of providing for the adjustment of the holder 4 longitudinally of the arm is to make the supporting arm in two telescoping sections, one of which carries the front annular clamping member 5, and the other of which carries the holder 4. Such a construction is shown in Figs. 6 and 7.

Figure 6:
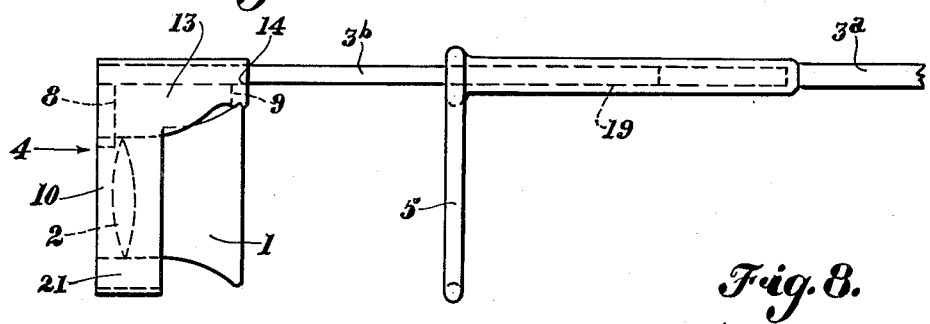
Fig. 6 is a fragmentary side view showing a modified form of the invention.
Figure 8:
Fig. 8 is a section on the line 8—8, Fig. 7.

In Fig. 6, the supporting arm is made in the two sections 3a and 3b, the section 3a having the tubular portion 19 into which the end of the arm section 3b may telescope, the holder 4 being rigidly mounted on the outer end of the section 3b. By telescoping the end of the section 3b into the tubular portion 19 of the section 3a to a greater or less extent, the holder 4 with its magnifying glass 1 may be adjusted toward and from the annular member 5.

Figure 7:
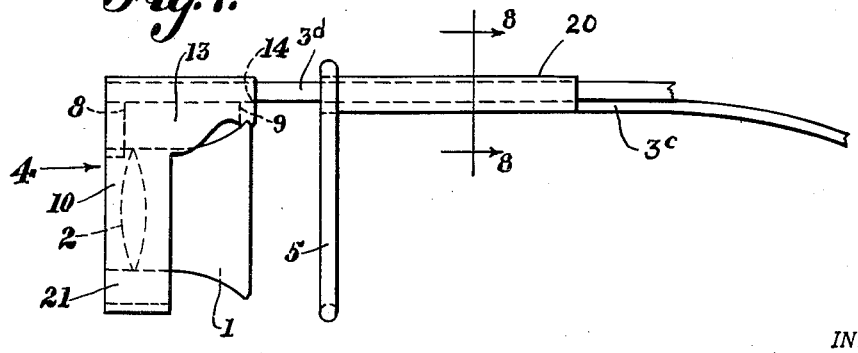
Fig. 7 is a fragmentary side view showing another modification of the invention.

In Fig. 7, the supporting arm is also made in two sections, a section 3c on which is rigidly mounted the annular member 5, and a section 3d which carries at its end the holder 4 for the magnifying glass 1. The arm section 3c is formed on its outer side with a tubular portion 20 which is open at both ends and which has a cross sectional shape to fit the cross sectional shape of the arm section 3d. The end of the arm section 3d extends through the tubular portion 20, and said section 3d can be adjusted relative to the tubular portion to bring the magnifying glass nearer to or further from the front annular clamping member 5. In fact, with this construction it is possible to bring the holder 4 and the magnifying glass held thereby up close to said front annular clamping member 5 thus producing the same effect as would be produced if the magnifying glass were held in the eye of the user.

The advantage of the construction shown in Figs. 6 and 7 is that no part of the supporting arm projects beyond the holder 4 when said holder is moved toward the front annular clamping member 5, as is the case in the embodiment of the invention shown in Figs. 1, 2, and 3. This is an advantage because if the user wishes to adjust the magnifying glass closer to his eye, no portion of the arm will project beyond the magnifying glass to interfere with his work as might be the case in connection with the construction shown in Figs. 1, 2, and 3.

The terminal 17 of the rear resilient clamping member 7 is provided with a notch 18 and as the rear clamping member is formed as a continuation of the arm 3, the end of the rear clamping member may be introduced through the annular front clamping member 5 from the front as shown in Fig. 1 when the device is not in use. The resiliency of the rear clamping member 7 serves to hold the notch 18 in engagement with the front clamping member, thereby holding the rear clamping member in its folded position. When the rear clamping member is in its folded position, it will be placed under some tension and hence any resiliency of said rear clamping member, which may be lost because of its being held in its more open position when in use on the head of the user, will be restored when the end 17 of the rear clamping member is engaged with the front clamping member.

I claim:

1. A holding device for a jeweler's magnifying glass and the like comprising a supporting arm having means to clamp it to the head of the user, a holder element mounted on said arm adjacent its front end and adjustable longitudinally thereof, said holder having a resilient socket portion to removably receive the small end of a jeweler's magnifying glass and also having a laterally extending spacing element to engage the peripheral portion of the larger end of said glass and assist in holding said glass in correct axial alinement.

2. A holding device for a jeweler's magnifying glass and the like comprising a supporting arm having means to clamp it to the head of a user, a holder element mounted on said arm adjacent its end and adjustable longitudinally thereof, said holder having a band, a portion of which encircles the arm and another portion of which is formed to constitute a socket to receive the small end of a jeweler's magnifying glass, said holder also having a laterally extending spacing element adhesively secured to the band and interposed between said arm and the small end of said magnifying glass, the portion of the band which encircles the arm having a width substantially equal to the length of the magnifying glass, and a second laterally extending spacing element adhesively united to the wide portion of the band and interposed between said arm and the periphery of the larger end of said magnifying glass, said second spacing element cooperating with the socket portion of the band to hold such magnifying glass in correct axial alinement.

ALBERT T. CLARKE.

REFERENCES CITED

The following references are of record in the file of this patent:

UNITED STATES PATENTS

| Number | Name | Date |
|---|---|---|
| 232,985 | Levin | Oct. 5, 1880 |
| 575,075 | Stevens | Jan. 12, 1897 |
| 624,369 | McLernon | May 2, 1899 |
| 1,065,346 | Day | June 24, 1913 |
| 1,130,689 | Atkinson | Mar. 2, 1915 |
| 1,562,046 | Perrin | Nov. 17, 1925 |
| 1,964,243 | Behr | June 26, 1934 |
| 2,024,322 | Wittig | Dec. 17, 1935 |
| 2,175,896 | Jiranek | Oct. 10, 1939 |
| 2,193,968 | Kohl | Mar. 19, 1940 |
| 2,270,931 | Corcoran | Jan. 27, 1942 |
| 2,379,214 | Bolinger | June 26, 1945 |

FOREIGN PATENTS

| Number | Country | Date |
|---|---|---|
| 29,167 | France | Mar. 3, 1925 |
| | (Addition to No. 570,625) | |